L. J. SLEPH.
TURN TABLE.
APPLICATION FILED JAN. 24, 1910.
967,581.
Patented Aug. 16, 1910.
4 SHEETS—SHEET 4.
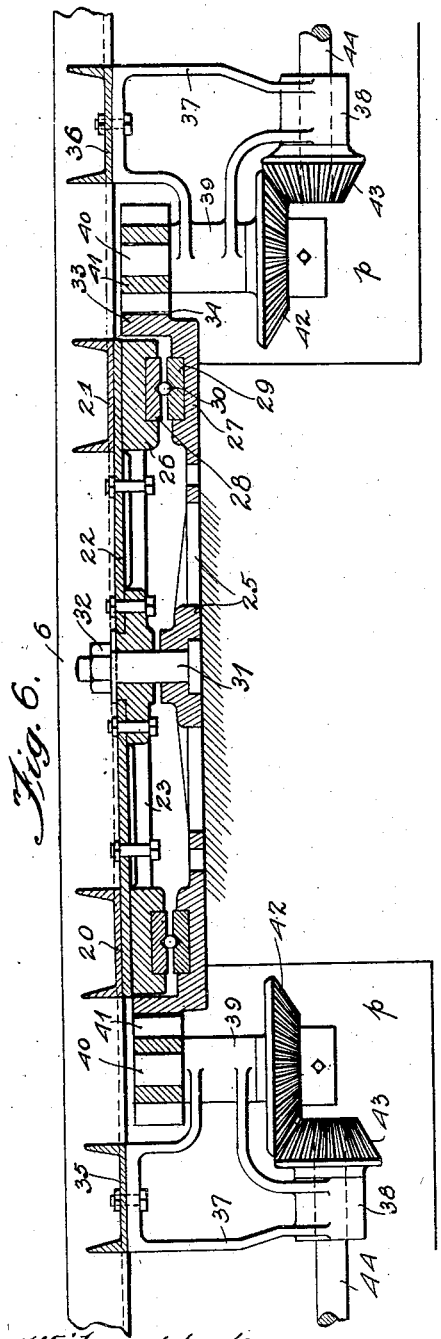
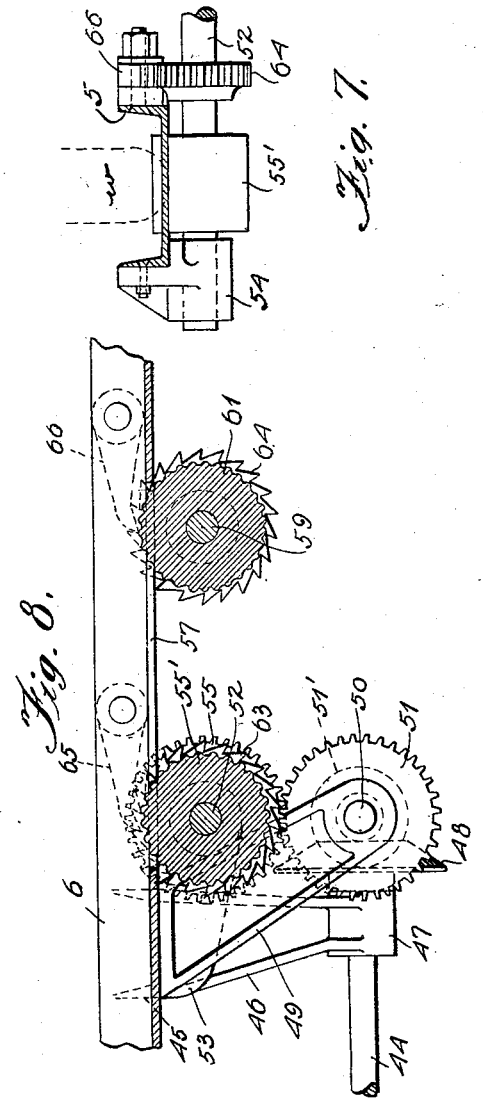
Witnesses:
Inventor:
Louis J. Sleph
By
Atty

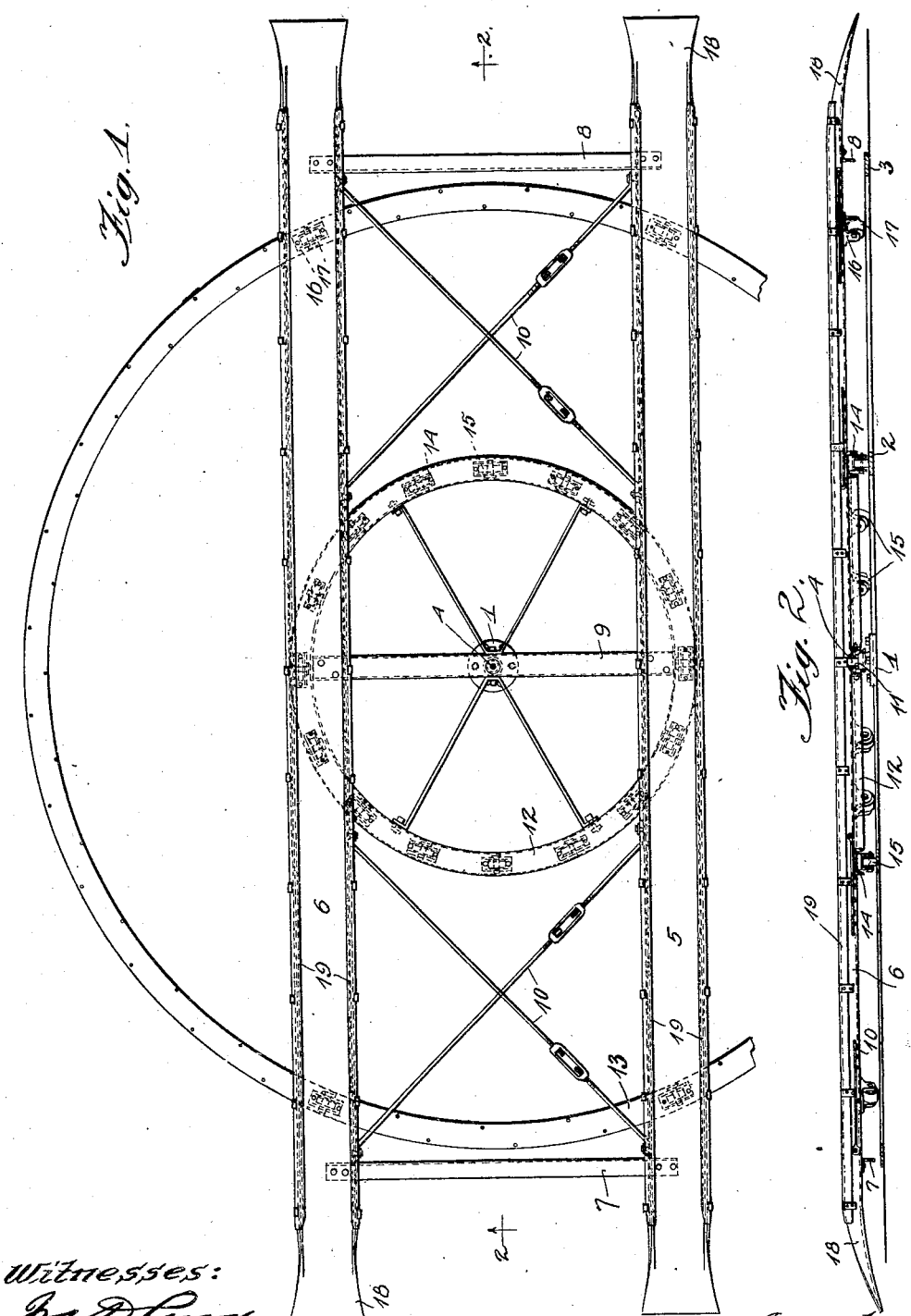

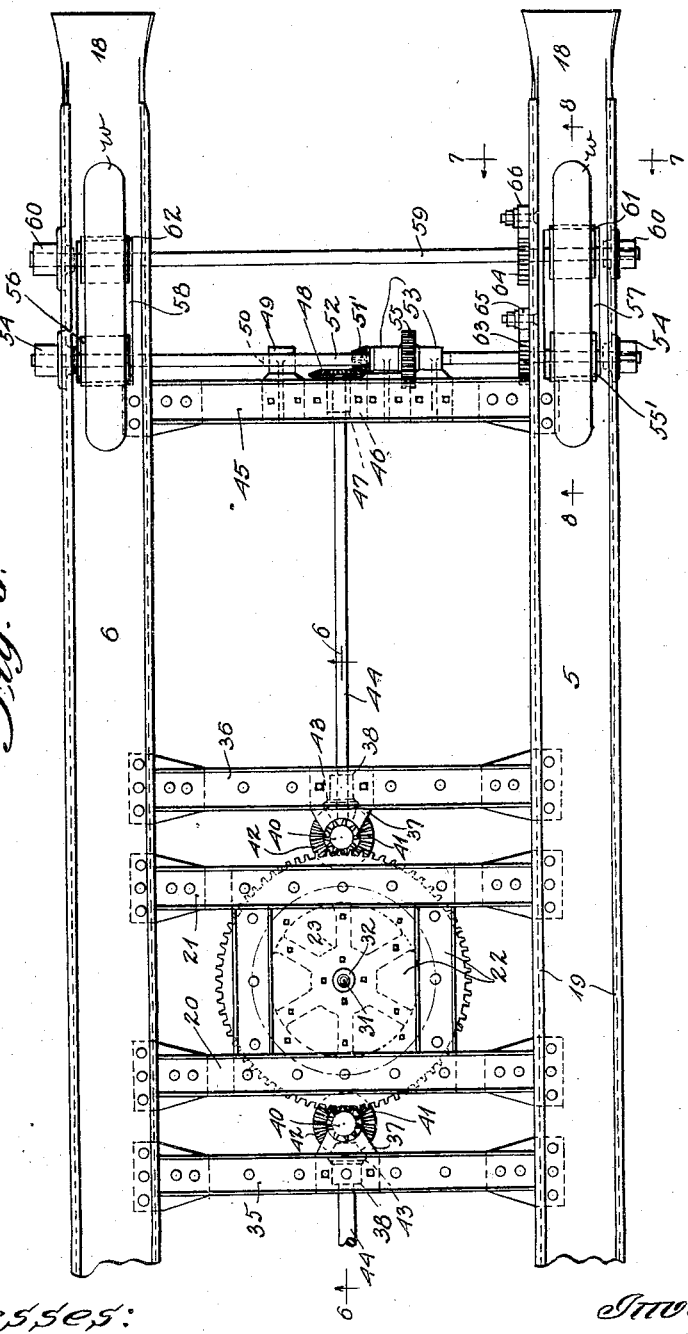

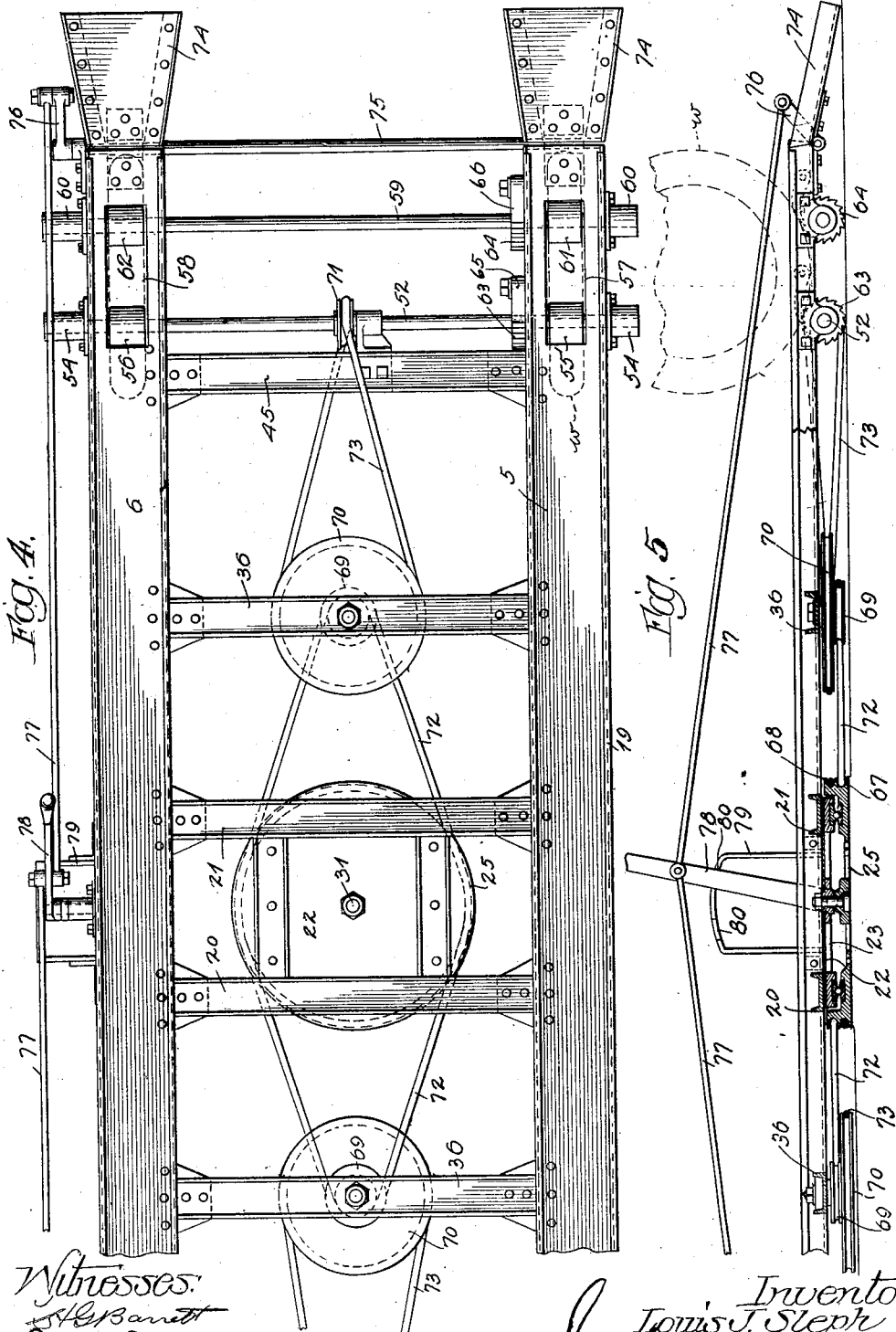

UNITED STATES PATENT OFFICE.

LOUIS J. SLEPH, OF CHICAGO, ILLINOIS.

TURN-TABLE.

967,581. Specification of Letters Patent. Patented Aug. 16, 1910.

Application filed January 24, 1910. Serial No. 539,734.

*To all whom it may concern:*

Be it known that I, LOUIS J. SLEPH, a citizen of the United States, and residing at Chicago, county of Cook, and State of Illinois, have invented new and useful Improvements in Turn-Tables, of which the following is a specification.

My invention relates to turn tables particularly adapted for turning vehicles such as automobiles.

In garages which have limited floor space or which at times become crowded it is difficult to turn vehicles in the natural way, but by means of a turn table they can be readily turned within a very small space.

Among the salient objects of my invention are to provide a simple, light, yet strong turntable which can readily be transported and which can quickly be set up for service; to provide a structure which is adaptable to be turned by hand or by power; to provide a structure which can be operated by power derived from the wheels of an automobile when in place thereon; to provide a structure on to which a vehicle can readily travel; to provide arrangement for confining the vehicle to the structure during the turning operation; and in general to provide an improved device of the character referred to.

My invention is clearly described in the accompanying specification and shown on the following drawings:

In these drawings: Figure 1 is a plan view of one form of turntable; Fig. 2 is a sectional view taken from plane 2—2 Fig. 1. Fig. 3 is a plan view of the center and one end of a power driven table; Fig. 4 is a similar view showing a modified form of power driven table; Fig. 5 is a side view, partly in central longitudinal section, of Fig. 4; Fig. 6 is an enlarged sectional view taken from plane 6—6 Fig. 3; Fig. 7 is an enlarged sectional view taken from plane 7—7 Fig. 3, and Fig. 8 is an enlarged sectional view taken from plane 8—8 Fig. 3.

Referring to Figs. 1 and 2, the stationary part of the structure comprises a central pivot block 1, and inner and outer track circles 2 and 3 respectively, concentric with the pivot block, the block and circles resting on the floor. The pivot block supports a vertical pivot pin 4. The superstructure comprises two track beams 5 and 6, preferably in the form of channels, connected and braced by end transverse bars 7 and 8 and a central transverse bar 9, also by cross rods 10. The central bar 9 at its middle has a pivot opening 11 for receiving the pivot pin 4 and secured to the under side of the beams concentric with the pivot opening, are flat rings 12 and 13 of the same diameters as track rings 2 and 3 respectively. Secured to the inner ring 12 are a plurality of caster frames 14 journaling caster wheels 15 for engaging the inner track ring 2, and supported from the outer ring 13 are caster frames 16 journaling casters 17 for engaging the outer track ring 3. The ends of the beams are deflected downwardly and flared laterally to form approach inclines 18 from the floor to the channels, and the flanges of the beams may be reinforced by angle bars 19 secured at one of their flanges to the beam flanges with their other flanges extending laterally inwardly over the beam flange edges. These angle bars also serve to hold the vehicle wheels in the channels. The vehicle can readily travel on to the superstructure by means of the inclines and when in central position thereon, the superstructure is turned any angle desired whereupon the vehicle can readily leave it. The superstructure being mounted on casters rolling over smooth tracks, can be turned with little effort. The entire structure is very light and can be readily moved about and transported.

Where heavy vehicles are to be turned motive power can be applied to the superstructure. In Fig. 3 I have shown gearing mechanism for operating the table, this mechanism being shown more in detail in Figs. 6, 7 and 8. The track beams in this arrangement are rigidly connected by transverse beams 20 and 21 which support a cross plate 22 to which is bolted the upper member 23 of a ball bearing structure, the member being in the form of a wheel. The lower member 25 of the bearing structure engages the floor and is rigidly secured thereto. The flat rims 26 and 27 of the upper and lower members respectively, have pocket bearing rims 28 and 29 between which bearing balls 30 are confined. A central pivot stud 31 extends upwardly from the lower member and passes centrally through the upper member which is confined thereto by bolt 32. The lower member has the vertical peripheral flange 33 in whose outer surface are cut gear teeth 34.

Adjacent the transverse beams 20 and 21, the additional transverse beams 35 and 36 connect between the track beams 5 and 6. Each of these beams 35 and 36 carry centrally a depending bracket 37 providing a lower horizontal bearing head 38, and an inner vertical bearing head 39. Journaled in each head 39 is a shaft 40 whose upper end carries a pinion 41 meshing with gear teeth 34, and whose lower end carries a bevel gear 42 meshing with a bevel pinion 43 carried on the inner end of a longitudinal shaft 44 journaled in the corresponding head 38. Connecting the track beams at each end thereof is a transverse beam 45 carrying centrally a depending bracket 46 (Fig. 8) terminating in a bearing head 47 for journaling the outer end of the corresponding shaft 44 which carries outside of the bearing head a bevel gear 48. Depending also from the beam 45 are brackets 49 journaling a short shaft 50 which carries a plain gear 51 and a bevel pinion 51' meshing with bevel gear 48. Above shaft 50 a shaft 52 extends between and beyond the track beams, being journaled in brackets 53 suspended from beam 45 and in brackets 54 extending from the outer edges of the track beams. This shaft 52 carries a gear 55 meshing with gear 51. Rotation of shaft 52 will be transmitted to the turn table through transmission train involving members 55—51—50—51'—48—44—43—42—40 and 41. The shaft 52 may be turned by a motor (not shown) connecting with gear 55, or can be turned by power from the vehicle engine applied preferably by means of the vehicle drive wheels. For this purpose each shaft 52 rigidly supports at its ends friction drive rollers 55' and 56 which project upwardly through openings 57 and 58 in the beams 5 and 6 respectively. Adjacent each shaft 52 is a parallel shaft 59 journaled in brackets 60 on the track beams and carrying rollers 61 and 62 projecting upwardly through the openings 57 and 58 respectively in line with the rollers on shaft 52. The opposite pairs of rollers serve to receive the driving wheels $w$ of the vehicle as illustrated in Figs. 3, 5 and 7. When the wheels are in position rotation thereof is communicated through the various shafts and gear trains to the turn table which will turn with the vehicle thereon. Adjacent one of the track beams, the shafts 52 and 59 carry ratchet wheels 63 and 64 respectively, engaged respectively by pawls 65 and 66 pivoted to the track beam. The pawls extend inwardly over the ratchet wheels so that as a vehicle enters the tracks from one end, the rollers will be prevented from turning to enable the vehicle drive wheels to assume position on the rollers, the drive wheels being then reversed and the shaft 52 driven to operate the turning mechanism. After the table has been turned to the position desired the drive wheels are again set for forward rotation and the vehicle can be driven from the table, the pawls again blocking the rollers. To increase the friction, the rollers can have roughened or corrugated surfaces as shown in Fig. 8.

As the brackets 37 and gears 42, 43, 48 and 51 extend some distance below the table track beams, an annular pit $p$ is preferably provided for their accommodation. In Figs. 4 and 5 a modified arrangement is shown which allows all the driving members to remain over the floor level, pulley and belt transmission being provided instead of gearing. The lower stationary bearing member 25 has belt grooves 67 and 68 instead of teeth, and beams 36 pivot pulleys 69 and 70, while shafts 52 carry pulleys 71, belts 72 connecting between main member 25 and pulleys 69, and belts 73 connecting pulleys 70 with pulleys 71.

The incline ends of the track beams may be in the form of pans 74 pivoted to the track beam ends. These pans can also be utilized to prevent the vehicle from prematurely leaving the table. As shown, the pans at each end of the table are secured to a rod 75 journaled at the beam ends and having at one end an arm 76, the arms connecting by rods 77 with a central lever 78. Swing of this lever in one direction lowers the pans at one end and raises the pans at the other end of the table so that the vehicle may enter at one end but is prevented from leaving the table until the raised pans are lowered. A frame 79 having locking notches 80 for the lever may be provided.

I thus provide turntable mechanism which is simple and compact and which can be readily transported and set up for operation.

I do not desire to be limited to the embodiments of my invention which I have shown and described as modifications are possible which would still come within the scope of my invention and I therefore claim the following:

1. In a turntable the combination of two parallel channel beams forming tracks, cross bars and braces connecting between said beams, an annulus secured to said beams concentric with a pivot center, casters on the underside of said annulus, a stationary pivot block engaging with one of said bars at the pivot center, and a track for said casters.

2. In a turn table, a track structure having two track beams, means for mounting said structure to be rotatable about a pivot center, friction rollers pivoted to and extending through said track beams to be engaged by the drive wheels of a power driven vehicle and to be rotated thereby, and transmission mechanism for translating rotation of said friction rollers into bodily rotation of the track structure about said pivot center.

3. In a turntable, the combination of a superstructure pivoted at its center and comprising track beams, friction rollers pivoted to said superstructure and projecting through said track beams to be engaged by the drive wheels of a power driven vehicle to be rotated thereby, transmission mechanism for translating rotation of said friction rollers into bodily rotation of the superstructure about its pivot, and means for allowing rotation of said friction rollers only in one direction.

4. In a turntable, the combination of a superstructure pivoted at its center and comprising track beams, friction rollers pivoted to said superstructure and projecting through said track beams to be engaged by the drive wheels of a power driven vehicle to be rotated thereby, transmission mechanism for translating rotation of said friction rollers into bodily rotation of the superstructure about its pivot, and pawl and ratchet mechanism for allowing rotation of said friction rollers only in one direction.

5. In a turntable, the combination of a pivoted track superstructure comprising track beams, drive pinions pivoted on said superstructure, a stationary gear concentric with the pivot center of said superstructure and engaged by said pinions, friction rollers pivoted on said track beams and projecting beyond the upper surface thereof to be engaged by the drive wheels of a power driven vehicle supported on said structure, and transmission mechanism between said rollers and pinions, rotation of said pinions causing travel thereof about said stationary gear and bodily rotation of the superstructure about its pivot center.

6. In a turntable, the combination of track beams and connecting members forming a superstructure adapted for receiving a vehicle and pivoted to rotate about a central point, a stationary pivot support for said superstructure, rollers pivoted on said superstructure and extending through said track beams to be engaged by the drive wheels of a power driven vehicle supported on said superstructure, and transmission mechanism carried by said superstructure and connecting between said rollers and said stationary pivot support whereby rotation of said rollers will result in bodily rotation of said superstructure about its pivot center.

7. In a turn table, the combination of a pivoted track structure, approach inclines pivoted to said structure, at its ends, and means for raising the inclines at one end and for simultaneously lowering the inclines at the other end of the structure.

8. In a turn table, the combination of a stationary pivot support, a track structure pivoted on said support, approach inclines pivoted to the ends of said track structure, and a lever connecting with said inclines whereby said inclines may be swung to engage the floor at one end and to assume an upright position at the other end.

9. In a turn table, the combination of a track structure having two track beams, a stationary support to which said structure is centrally pivoted, approach inclines pivoted to the ends of the track beams, and means for swinging the inclines at one end of the beams to the floor to allow a vehicle to enter the tracks and for simultaneously raising the inclines at the other end of the beams to prevent premature escape of the vehicle from said tracks.

10. In a turn table, the combination of a stationary pivot frame, a track structure pivoted at a central point to said frame and adapted to support vehicles to be turned therewith, friction rollers positioned to be engaged and to be rotated by drive wheels of said vehicle, transmission mechanism for transmitting rotation of said friction wheels to said track structure to cause bodily turning thereof about its pivot, and means for holding the drive wheels in engagement with the friction rollers during rotation of said rollers by said wheels.

11. In a turn table the combination of a track structure for receiving a vehicle to be turned, a stationary pivot support for said structure about which it may bodily rotate, a pair of friction rollers projecting beyond the top of said track structure for engaging with a drive wheel of said vehicle, and transmission mechanism connecting one of said rollers with the track structure whereby rotation of said roller by said wheel will result in bodily rotation of said track structure.

12. In a turn table the combination of a track structure for receiving a vehicle to be turned, a stationary pivot support for said structure about which it may bodily rotate, a pair of friction rollers projecting beyond the top of said track structure for engaging with a drive wheel of said vehicle, transmission mechanism connecting one of said rollers with the track structure whereby rotation of said roller by said wheel will result in bodily rotation of said track structure, and means for limiting said rollers to rotation in only one direction.

13. In a turn table, the combination of a stationary member having a flat rim, a similar member rotatably pivoted concentrically on said stationary member, a track superstructure carried on said rotatable member, friction rollers pivoted to the track superstructure to receive and to be driven by the power driven wheels of a vehicle, and transmission mechanism carried by the superstructure and connecting between the friction rollers and said stationary member to translate rotation of the rollers into rotation of said rotatable member and track superstructure carried thereby.

14. In a turntable, a stationary supporting member having a flat annular rim, a rotatable member having a flat annular rim, a ball bearing interposed between said rims, a track superstructure carried by said rotatable member, friction rollers pivoted on said superstructure in position to receive and to be driven by the wheels of a power driven vehicle, and a transmission train connecting between said rollers and said stationary member to translate rotation of said rollers into rotation of the rotatable member and the track superstructure with the vehicle thereon.

15. In a turn table, an annular supporting rim, a rotatable annular rim pivoted at the center of said supporting rim, a ball bearing between the rims, track beams carried by the rotatable member, friction rollers pivoted on said beams for receiving and being driven by wheels of a power driven vehicle, and transmission trains connecting said rollers with said supporting member to transmit rotation of the rollers to said rotatable rim and track structure thereon.

16. In a turn table, the combination of a pivoted track structure, inclines pivoted to the ends of said structure, a lever, and links connecting said lever with the inclines, rotation of said lever causing upward swing of the inclines at one end and downward swing of the inclines at the other end of the structure.

In witness whereof, I have signed my name to this specification in the presence of two subscribing witnesses.

LOUIS J. SLEPH.

Witnesses:
G. S. PINES,
R. BARRON.